May 15, 1923.
J. B. MINER
HALTER
Filed July 6, 1922
1,455,445
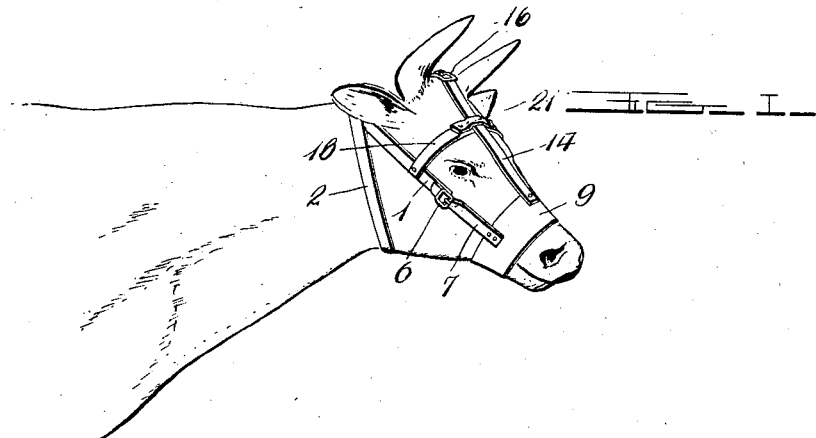
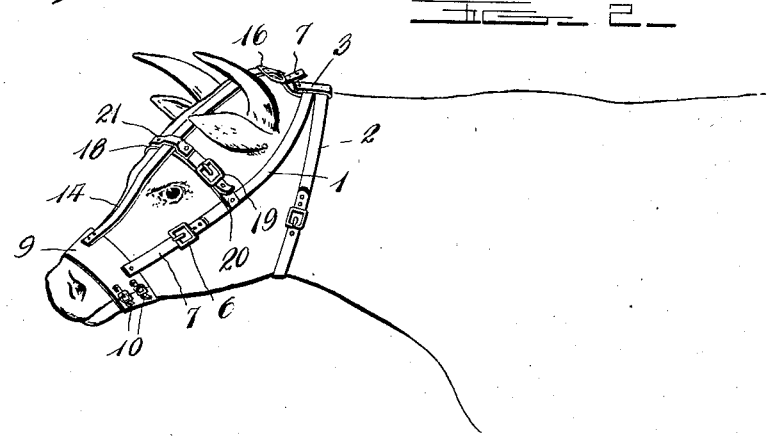
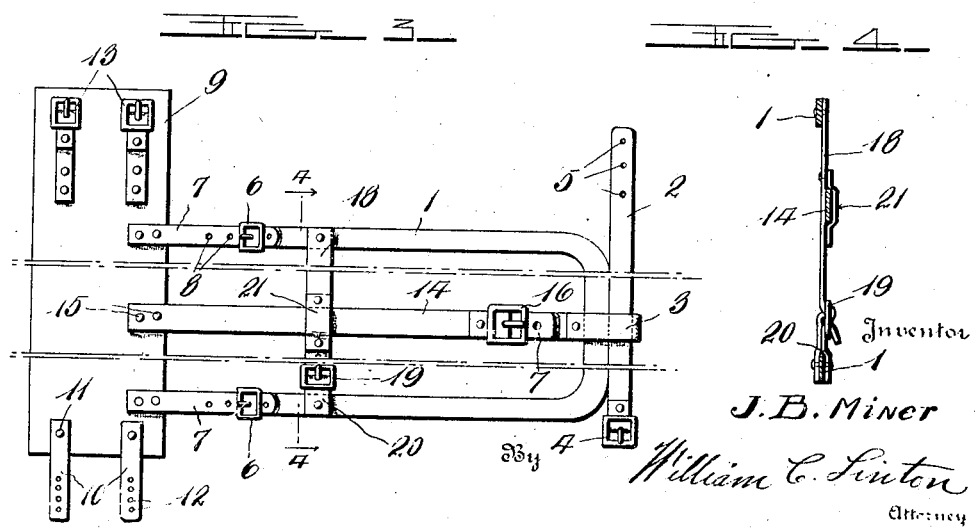
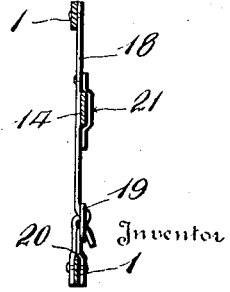
Inventor
J. B. Miner
William C. Sinton
Attorney Patented May 15, 1923.

1,455,445

UNITED STATES PATENT OFFICE.

JAMES B. MINER, OF BEND, OREGON.

HALTER.

Application filed July 6, 1922. Serial No. 573,161.

*To all whom it may concern:*

Be it known that I, JAMES B. MINER, a citizen of the United States of America, residing at Bend, in the county of Deschutes and State of Oregon, have invented certain new and useful Improvements in Halters; and I do hereby declare that the following is a full, clear, concise, and exact description of the invention, such as will enable others skilled in the art to which it appertains to make and use the same.

This invention relates to improvements in animal husbanding devices, having for an object to provide a novel form of anti-bloating halter especially desirable for use upon cattle and sheep and being of such construction and arrangement as to permit an animal provided with the same to eat a sufficient amount of food in its normal or usual manner without danger of becoming bloated.

It is a well known fact that when cattle or sheep are pastured in a field containing a good growth of alfalfa or clover, they frequently eat so ravenously as to become bloated and frequently die from such condition. By the use of my invention, a cow or sheep equipped with the same is enabled to open its mouth sufficiently to secure ample food through the arrangement of the adjustment of the muzzle encircling strap or guard. However, abnormal opening of the mouth will be prevented by reason of such strap or guard which will permit the animal to open its mouth only so far as conditions may warrant.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:

Figure 1 is a perspective view of the improved halter arranged upon the head of an animal;

Figure 2 is a similar view showing the manner in which the muzzle encircling strap or guard is adjusted about the muzzle of an animal;

Figure 3 is a plan view of the halter; and

Figure 4 is a transverse section taken on the line 4—4 of Figure 3 looking in the direction in which the arrows point.

Having more particular reference to the drawings, in connection with which like characters of reference will designate corresponding parts throughout, the improved halter may be stated to comprise a substantially U-shaped body portion 1, the opposite side straps of which are adapted to be disposed longitudinally of the opposite sides of the head of an animal, as shown in the Figure 1, while the basal portion thereof is adapted to be arranged transversely over the head of the animal and thus support said side longitudinal straps in proper positions. To secure the side longitudinal straps or body portion 1 in proper position upon the head of an animal, a throat encircling strap 2 is provided and is adapted to be connected to the basal portion of the body strap 1 through the medium of a loop 3; a buckle 4 being arranged upon one end of said throat encircling strap 2, while the opposite end portion of the strap is provided with a series of perforations or openings adapted to receive the tongue of said buckle 4 whereby the throat encircling strap may be snugly adjusted in position about the throat of an animal.

Buckles 6 are arranged upon the lower or free ends of the side longitudinal straps 1 and are adapted to be engaged with the upper end portion of shorter straps 7 having a series of perforations or tongue receiving perforations 8 therein adapted to be engaged with the several buckles 6. These shorter straps 7 are connected through the medium of rivets or other suitable fastening devices to the upper marginal portion of a transversely disposed muzzle encircling strap or guard 9 comprising a widened band having short straps 10 secured adjacent one of its end portions and disposed longitudinally of the same as indicated at 11; the free portions of these straps are provided with a series of tongue receiving openings 12. Buckles 13 are connected by short straps to the opposite end portions of the muzzle encircling guard 9 and as will be understood, are adapted to receive the free portions of said straps 10 therethrough, whereby the muzzle encircling guard may be snugly adjusted about the muzzle of an animal provided with the halter in a manner to permit the animal to open its mouth sufficiently to secure a normal amount of food but yet prevent abnormal opening of its mouth should the animal become gluttonous.

As additional means for supporting the muzzle encircling guard 9 in position about the muzzle of an animal, I provide a strap 14 disposing the same longitudinally of the head of an animal between its eyes as clearly shown in the Figure 2 and connecting the lower end thereof through the medium of rivets 15 to the intermediate portion of said guard 9; a buckle 16 being arranged upon the upper or remaining end of said strap and adapted to be engaged in openings 17 of a strap extension from the loop 3. Thus, it will be understood that the forward portion of the muzzle encircling guard 9 will be supported in proper position during usage of the halter.

As means for spacing the side longitudinal straps 1 and the longitudinal strap 14 in proper position upon the head of an animal provided with the halter, there is provided a transverse strap 18 connected adjacent one end portion of one of said side longitudinal straps in the manner shown in the Figure 3, while a series of perforations are formed in its opposite end and are adapted to receive therein the tongue of a buckle 19 secured to the lower portion of the opposite side longitudinal strap 1 through the medium of the cross strap 20. Thus, by proper adjustment of the free portion of the strap 18 in the buckle 19, said side longitudinal straps 1 and the strap 14 will be retained in proper positions upon the head of an animal. A loop 21 is secured to the outer side of the intermediate portion of the transverse strap 18 and as shown in the Figure 3, receives the intermediate portion of the longitudinal strap 14 therethrough for an obvious purpose.

In use of my improved halter, the body portion or main strap 1 is arranged over the head of the animal in the manner hereinbefore described with the transverse strap 18 disposed over the forehead of the animal and the muzzle encircling band disposed transversely of the muzzle of the animal. At this time, the opposite ends of the throat encircling bands 2 are joined, so that the band will be snugly engaged about the throat of the animal and thus secure the longitudinal and transverse straps of the halter in proper position upon the animal's head. At this time, the widened band or muzzle encircling guard 9 is engaged about the muzzle of the animal as shown in the Figure 1 whereupon the free portions of the strap 10 are engaged in the throats of the buckles 13 which in turn have their tongues engaged through a proper opening 12 in said strap 10 to cause snug engagement of the guard about the muzzle of the animal. In making this adjustment of the muzzle encircling guard upon the animal, proper consideration is given to the size necessary for the normal opening of the animal's mouth. However, the band is so adjusted as to prevent abnormal opening of the mouth of the animal, as would occur should it become gluttonous. The extent to which the mouth of the animal may be opened may be also materially regulated by longitudinal adjustment of the muzzle encircling guard over the muzzle of the animal through the medium of the side longitudinal straps 1 and the short straps 7, the free portions of said short straps being moved towards or away from the free portions of said longitudinal side straps so as to secure proper positioning of said guard about the animal's muzzle. When proper longitudinal positioning of the guard 9 has been attained, the tongues of the buckles 6 and the free ends of the side longitudinal straps 1 are engaged in the adjacent perforations 8 of the free portions of said short straps 7. Likewise, with adjustment of the straps 7 with relation to the side longitudinal straps 1, the longitudinal strap 14 is adjusted with respect to the buckle 16 received upon the strap extension of the loop 3.

Manifestly, the construction shown is capable of considerable modification and such modification as is within the scope of my claim, I consider within the spirit of my invention.

I claim:

A halter of the character described comprising a substantially U-shaped body portion having the side straps thereof arranged in a manner to extend longitudinally of the opposite sides of the head of an animal and its basal portion to be engaged over the head of such animal, a throat encircling strap connected intermediate its ends to said body portion adjacent its basal part, a muzzle encircling strap consisting of a widened band, straps connected to the upper marginal portions of said muzzle encircling strap adapted to be adjustably connected to the lower ends of said longitudinal side straps, another longitudinal strap connected to the upper marginal portion of said muzzle encircling strap intermediate said first straps having its upper end disposed for adjustable connection with the basal portion of said body portion, adjustable transversely disposed means connected to said longitudinal side straps and slidably receiving said last mentioned longitudinal strap therethrough, and means upon the opposite ends of said muzzle encircling strap for effecting circumferential adjustment of the same.

In witness whereof I have hereunto set my hand.

JAS. B. MINER.